US009545916B2

(12) United States Patent
Kamatani et al.

(10) Patent No.: US 9,545,916 B2
(45) Date of Patent: Jan. 17, 2017

(54) HYBRID VEHICLE

(71) Applicant: TOYOTA JIDOSHA KABUSHIKI KAISHA, Toyota-shi, Aichi-ken (JP)

(72) Inventors: Hideki Kamatani, Nagoya (JP); Takaya Soma, Okazaki (JP); Takao Itoh, Seto (JP); Etsushi Taguchi, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/923,611

(22) Filed: Oct. 27, 2015

(65) Prior Publication Data

US 2016/0114788 A1   Apr. 28, 2016

(30) Foreign Application Priority Data

Oct. 28, 2014   (JP) ................................ 2014-219608

(51) Int. Cl.
*B60L 9/00* (2006.01)
*B60L 11/14* (2006.01)
(Continued)

(52) U.S. Cl.
CPC .............. *B60W 20/14* (2016.01); *B60L 11/04* (2013.01); *B60L 11/12* (2013.01); *B60L 11/14* (2013.01); *B60W 10/06* (2013.01); *B60W 10/08* (2013.01); *B60W 10/192* (2013.01); *B60W 10/30* (2013.01); *B60W 2540/00* (2013.01); *B60W 2710/0666* (2013.01); *B60W 2710/083* (2013.01);
(Continued)

(58) Field of Classification Search
CPC ...... B60W 20/14; B60W 10/06; B60W 10/08; B60W 10/192; B60W 10/30; B60W 2710/0666; B60W 2710/083; B60W 2710/18; B60W 2710/305; B60L 11/04; B60L 11/14; Y10S 903/93

USPC ........................ 701/22; 180/65.265; 903/930
See application file for complete search history.

(56) References Cited

U.S. PATENT DOCUMENTS

2002/0112904 A1* 8/2002 Matsunobu ............... B60K 6/26
180/65.23
2007/0175429 A1* 8/2007 Yanagida ................. F02N 11/04
123/179.14
(Continued)

FOREIGN PATENT DOCUMENTS

JP   2010-260477   11/2010
JP   2014-23263    2/2014

*Primary Examiner* — Shardul Patel
(74) *Attorney, Agent, or Firm* — Finnegan, Henderson, Farabow, Garrett & Dunner, LLP (57) ABSTRACT

When all conditions for increasing a regeneration amount are established, and when a motor temperature Tmg is lower than a predetermined temperature, and a rotation speed Nm1 of a motor MG1 is lower than a predetermined rotation speed, a motor requirement upper limit value VHlimmg is set by imposing a limit for reducing a drive voltage system voltage VH (S130). In so doing, the regeneration amount can be increased by suppressing heat generation by a diode of a lower arm of a step-up converter. When, on the other hand, the motor temperature Tmg equals or exceeds the predetermined temperature or the rotation speed Nm1 of the motor MG1 equals or exceeds the predetermined rotation speed, the motor requirement upper limit value VHlimmg is set by relaxing or canceling the limit for reducing the drive voltage system voltage VH (S130).

12 Claims, 6 Drawing Sheets

(51) Int. Cl.
*B60L 11/12* (2006.01)
*B60L 11/04* (2006.01)
*B60W 10/06* (2006.01)
*B60W 10/08* (2006.01)
*B60W 10/192* (2012.01)
*B60W 10/30* (2006.01)

(52) U.S. Cl.
CPC ... *B60W 2710/18* (2013.01); *B60W 2710/305* (2013.01); *Y10S 903/93* (2013.01)

(56) References Cited

U.S. PATENT DOCUMENTS

| | | | | |
|---|---|---|---|---|
| 2012/0112693 | A1* | 5/2012 | Kusch | B60L 11/005 320/109 |
| 2013/0106195 | A1* | 5/2013 | Kusch | H02J 7/1423 307/82 |
| 2013/0175809 | A1* | 7/2013 | Yamamoto | F02N 11/0844 290/38 C |
| 2014/0076875 | A1* | 3/2014 | Gale | B60W 10/30 219/202 |
| 2014/0297085 | A1* | 10/2014 | Hayashi | B60K 6/445 701/22 |
| 2015/0298688 | A1* | 10/2015 | Teraya | B60L 1/006 701/22 |

\* cited by examiner

HYBRID VEHICLE

INCORPORATION BY REFERENCE

The disclosure of Japanese Patent Application No. 2014-219608 filed on Oct. 28, 2014 including the specification, drawings and abstract, is incorporated herein by reference in its entirety.

BACKGROUND OF THE INVENTION

1. Field of the Invention

The invention relates to a hybrid vehicle, and more particularly to a hybrid vehicle having an internal combustion engine, a power generator, a motor, a planetary gear, a battery, and a step-up/step-down converter (a buck-boost converter).

2. Description of Related Art

A hybrid vehicle of this type proposed in the related art includes a step-up converter having a switching element, a diode, and a reactor, and a cooling apparatus that cools the converter (see Japanese Patent Application Publication No. 2014-23263 (JP 2014-23263 A), for example). When regenerative braking is performed in this hybrid vehicle, input currents of power elements such as the switching element and the diode are limited using a limit value that decreases steadily as a duty ratio employed during switching control increases and a cooling temperature of the cooling apparatus rises. As a result, the power elements are prevented from overheating, and a larger amount of regenerative power is obtained.

SUMMARY OF THE INVENTION

In the hybrid vehicle described above, it is desirable to increase the amount of power that is regenerated and charged to a battery during braking in order to improve the fuel efficiency. For this purpose, a high voltage side voltage may be reduced in order to obtain a larger regenerative current. An ON duty of the duty ratio used in the switching control performed on the step-up converter during regeneration varies in accordance with a step-up ratio (high voltage side voltage/low voltage side voltage) such that an amount of heat generated by a diode of a lower arm increases steadily as the high voltage side voltage increases. By reducing the high voltage side voltage, therefore, the amount of heat generated by the diode of the lower arm can be suppressed, leading to an increase in the regeneration amount. When the high voltage side voltage is reduced in a hybrid vehicle in which an internal combustion engine, a power generator, and a motor are connected by a planetary gear, however, a torque output of the power generator is limited, and therefore torque for suppressing a rotation speed of the internal combustion engine may be insufficient. As a result, racing may occur in the internal combustion engine, causing the power generator to overspeed. Further, when the high voltage side voltage is reduced, the power generator and the motor are more likely to increase in temperature, and are therefore more likely to be affected by demagnetization.

With a hybrid vehicle according to the invention, the regeneration amount can be increased during braking while protecting the motor and the power generator.

A hybrid vehicle according to a first aspect of the invention includes: an internal combustion engine; a power generator configured to receive and output power; a planetary gear including three rotary elements, the three rotary elements being connected respectively to an output shaft of the internal combustion engine, a rotary shaft of the power generator, and a drive shaft coupled to an axle; a motor configured to i) receive power from the drive shaft and ii) output power to the drive shaft; a drive circuit configured to drive the power generator and the motor; a battery; a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and at least one electronic control unit configured to i) control the buck-boost converter such that a voltage of the high voltage power line reaches a voltage that is a) equal to or smaller than an upper limit voltage and b) is based on a torque command applied to the power generator and the motor, ii) control the internal combustion engine, the power generator, and the motor such that a required torque corresponding to a request from a driver is output and used to run the hybrid vehicle, iii) limit the upper limit voltage to a braking limit when a rotation speed of the power generator is lower than a predetermined rotation speed during regenerative braking in the hybrid vehicle, and iv) relax the limit on the upper limit voltage in comparison with the braking limit when the rotation speed of the power generator equals or exceeds the predetermined rotation speed during regenerative braking in the hybrid vehicle.

In the hybrid vehicle according to the first aspect of the invention, the upper limit voltage is limited to the braking limit when the rotation speed of the power generator is lower than the predetermined rotation speed during regenerative braking in the vehicle. In other words, during regenerative braking in the vehicle, the voltage of the high voltage power line is reduced accordingly, heat generation by the diode of the lower arm of the step-up/step-down converter can be suppressed, and as a result, the regeneration amount can be increased. Further, in the hybrid vehicle according to the first aspect of the invention, when the rotation speed of the power generator equals or exceeds the predetermined rotation speed during regenerative braking in the hybrid vehicle, the limit on the upper limit voltage is relaxed in comparison with the braking limit applied when the rotation speed is lower than the predetermined rotation speed. In other words, when the rotation speed of the power generator equals or exceeds the predetermined rotation speed during regenerative braking in the vehicle, the voltage of the high voltage power line can be increased in comparison with the voltage thereof when the rotation speed is lower than the predetermined rotation speed. Accordingly, the torque limit on the power generator is relaxed so that sufficient torque for suppressing the rotation speed of the internal combustion engine can be output from the power generator, and as a result, overspeeding of the power generator due to a torque deficiency in the power generator can be suppressed. Hence, by modifying the limit on the upper limit voltage depending on whether or not the rotation speed of the power generator equals or exceeds the predetermined rotation speed during regenerative braking in the vehicle, the regeneration amount can be increased while protecting the motor and the power generator. Here, relaxing the limit on the upper limit voltage includes canceling the limit on the upper limit voltage.

A hybrid vehicle according to a second aspect of the invention includes: an internal combustion engine; a power generator configured to receive and output power; a planetary gear including three rotary elements, the three rotary elements being connected respectively to an output shaft of the internal combustion engine, a rotary shaft of the power generator, and a drive shaft coupled to an axle; a motor configured to i) receive power from the drive shaft and ii) output power to the drive shaft; a drive circuit configured to drive the power generator and the motor; a battery; a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and at least one electronic control unit configured to i) control the buck-boost converter such that a voltage of the high voltage power line reaches a voltage that is a) equal to or smaller than an upper limit voltage and is b) based on a torque command applied to the power generator and the motor, ii) control the internal combustion engine, the power generator, and the motor such that a required torque corresponding to a request from a driver is output and used to run the hybrid vehicle, iii) limit the upper limit voltage to a braking limit when a temperature of the power generator or the motor is lower than a predetermined temperature during regenerative braking in the hybrid vehicle, and iv) relax the limit on the upper limit voltage in comparison with the braking limit when the temperature of the power generator or the motor equals or exceeds the predetermined temperature during regenerative braking in the hybrid vehicle.

In the hybrid vehicle according to the second aspect of the invention, the upper limit voltage is limited to the braking limit when the temperature of the power generator or the motor is lower than the predetermined temperature during regenerative braking in the vehicle. In other words, during regenerative braking in the vehicle, the voltage of the high voltage power line is reduced. Accordingly, heat generation by the diode of the lower arm of the step-up/step-down converter can be suppressed, and as a result, the regeneration amount can be increased. Further, in the hybrid vehicle according to the second aspect of the invention, when the temperature of the power generator or the motor equals or exceeds the predetermined temperature during regenerative braking in the hybrid vehicle, the limit on the upper limit voltage is relaxed in comparison with the braking limit applied when the temperature is lower than the predetermined temperature. In other words, when the temperature of the power generator or the motor equals or exceeds the predetermined temperature during regenerative braking in the vehicle, the voltage of the high voltage power line can be increased in comparison with the voltage thereof when the temperature is lower than the predetermined temperature. Accordingly, a current flowing through the power generator or the motor can be reduced, with the result that a temperature increase in the power generator or the motor can be suppressed. Hence, by modifying the limit on the upper limit voltage depending on whether or not the temperature of the power generator or the motor equals or exceeds the predetermined temperature during regenerative braking in the vehicle, the regeneration amount can be increased while protecting the motor and the power generator. Here, relaxing the limit on the upper limit voltage includes canceling the limit on the upper limit voltage.

A hybrid vehicle according to a third aspect of the invention includes: an internal combustion engine; a power generator configured to receive and output power; a planetary gear including three rotary elements, the three rotary elements being connected respectively to an output shaft of the internal combustion engine, a rotary shaft of the power generator, and a drive shaft coupled to an axle; a motor configured to i) receive power from the drive shaft and ii) output power to the drive shaft; a drive circuit configured to drive the power generator and the motor; a battery; a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and at least one electronic control unit configured to i) control the buck-boost converter such that a voltage of the high voltage power line reaches a voltage that is a) equal to or smaller than an upper limit voltage and b) is based on a torque command applied to the power generator and the motor, ii) control the internal combustion engine, the power generator, and the motor such that a required torque corresponding to a request from a driver is output and used to run the hybrid vehicle, iii) limit the upper limit voltage to a braking limit when a) a rotation speed of the power generator is lower than a predetermined rotation speed and b) a temperature of the power generator or the motor is lower than a predetermined temperature during regenerative braking in the hybrid vehicle, and iv) relax the limit on the upper limit voltage in comparison with the braking limit when c) the rotation speed of the power generator equals or exceeds the predetermined rotation speed or d) the temperature of the power generator or the motor equals or exceeds the predetermined temperature during regenerative braking in the hybrid vehicle.

In the hybrid vehicle according to the third aspect of the invention, the upper limit voltage is limited to the braking limit when the rotation speed of the power generator is lower than the predetermined rotation speed and temperature of the power generator or the motor is lower than the predetermined temperature during regenerative braking in the vehicle. In other words, during regenerative braking in the vehicle, the voltage of the high voltage power line is reduced. Accordingly, heat generation by the diode in the lower arm of the step-up/step-down converter can be suppressed, and as a result, the regeneration amount can be increased. Further, in the hybrid vehicle according to the third aspect of the invention, the limit on the upper limit voltage is relaxed in comparison with the braking limit when the rotation speed of the power generator equals or exceeds the predetermined rotation speed or the temperature of the power generator or the motor equals or exceeds the predetermined temperature during regenerative braking in the hybrid vehicle. In other words, when the rotation speed of the power generator equals or exceeds the predetermined rotation speed and the temperature of the power generator or the motor equals or exceeds the predetermined temperature during regenerative braking in the vehicle, the voltage of the high voltage power line can be increased in comparison with the voltage thereof when the rotation speed of the power generator is lower than the predetermined rotation speed and the temperatures of both the power generator and the motor are lower than the predetermined temperature. Accordingly, the torque limit on the power generator is relaxed so that sufficient torque for suppressing the rotation speed of the internal combustion engine can be output from the power generator, with the result that overspeeding of the power generator due to a torque deficiency in the power generator can be suppressed, and the current flowing through the power generator or the motor can be reduced with the result that a temperature increase in the power generator or the motor can be suppressed. Hence, by modifying the limit on the upper limit voltage depending on whether or not the rotation speed of the power generator equals or exceeds the predetermined rotation speed and whether or not the temperature of the power generator or the motor equals or exceeds the predetermined temperature during regenerative braking in the vehicle, the regeneration amount can be increased while protecting the motor and the power generator. Here, relaxing the limit on the upper limit voltage includes canceling the limit on the upper limit voltage.

In any of the hybrid vehicles described above, the electronic control unit may be configured to refrain from limiting the upper limit voltage when a chargeable power of the battery is smaller than a predetermined power. The reason for this is that when the battery is insufficiently charged, it is not necessary to increase the regeneration amount.

Furthermore, in any of the hybrid vehicles described above, a cooling apparatus may be provided to cool the drive circuit, and the electronic control unit may be configured to refrain from limiting the upper limit voltage when an abnormality occurs in the cooling apparatus. The reason for this is that when an abnormality occurs in the cooling apparatus, heat generation by the drive circuit must be suppressed, and therefore component protection is considered to take precedence over increasing the regeneration amount.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, an embodiment of the invention will be described.

Figure 1:
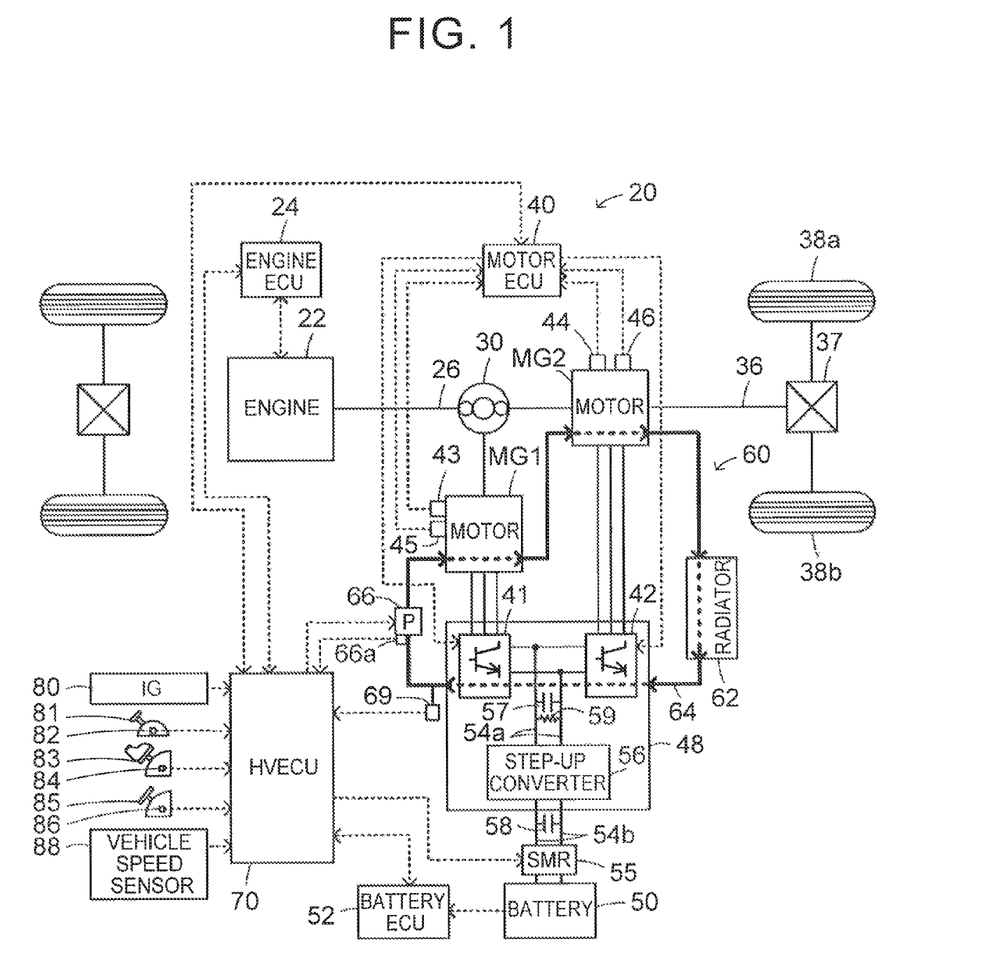
FIG. 1 is a schematic view showing a configuration of a hybrid vehicle serving as an embodiment of the invention.

FIG. 1 is a schematic view showing a configuration of a hybrid vehicle 20 serving as an embodiment of the invention. As shown in the drawing, the hybrid vehicle 20 according to this embodiment includes an engine 22, an engine electronic control unit (referred to hereafter as an engine ECU) 24, a planetary gear 30, a motor MG1, a motor MG2, inverters 41, 42, a motor electronic control unit (referred to hereafter as a motor ECU) 40, a battery 50, a battery electronic control unit (referred to hereafter as a battery ECU) 52, a step-up converter 56, an HV unit cooling apparatus 60, and a hybrid electronic control unit (referred to hereafter as an HV ECU) 70.

The engine 22 is constituted by an internal combustion engine that outputs power using general-purpose gasoline, light oil, or the like as fuel, and is drive-controlled by the engine ECU 24. The engine ECU 24 is constituted by a microprocessor, not shown in the drawings, that centers on a CPU and includes, in addition to the CPU, a ROM that stores a processing program, a RAM that stores data temporarily, an input/output port, and a communication port. Signals from various sensors that detect operating conditions of the engine 22, for example a crank position θcr from a crank position sensor that detects a rotation position of a crankshaft 26, a cooling water temperature Twe from a water temperature sensor that detects a temperature of cooling water in the engine 22, a cam position θca from a cam position sensor that detects a rotation position of a cam shaft that opens and closes an intake valve and an exhaust valve, a throttle position TP from a throttle position sensor that detects a position of a throttle valve, an intake air amount Qa from an air flow meter attached to an intake pipe, an intake air temperature Ta from a temperature sensor likewise attached to the intake pipe, and so on, are input into the engine ECU 24 via the input port. Various control signals for driving the engine 22, for example a drive signal for a fuel injection valve, a drive signal for a throttle motor that adjusts a position of the throttle valve, a control signal for an ignition coil formed integrally with an igniter, a control signal for a VVT 23, and so on, are output from the engine ECU 24 via the output port. Further, the engine ECU 24 communicates with the HV ECU 70 so as to control an operation of the engine 22 in response to a control signal from the HV ECU 70 and output data relating to the operating conditions of the engine 22 to the HV ECU 70 as required. Note that the engine ECU 24 also calculates a rotation speed of the crankshaft 26, or in other words a rotation speed Ne of the engine 22, on the basis of a signal from the crank position sensor, not shown in the drawing, attached to the crankshaft 26.

The planetary gear 30 is constituted by a single pinion planetary gear mechanism. A rotor of the motor MG1, a drive shaft 36 coupled to drive wheels 38a, 38b via a differential gear 37, and the crankshaft 26 of the engine 22 are connected respectively to a sun gear, a ring gear, and a carrier of the planetary gear 30.

Figure 2:
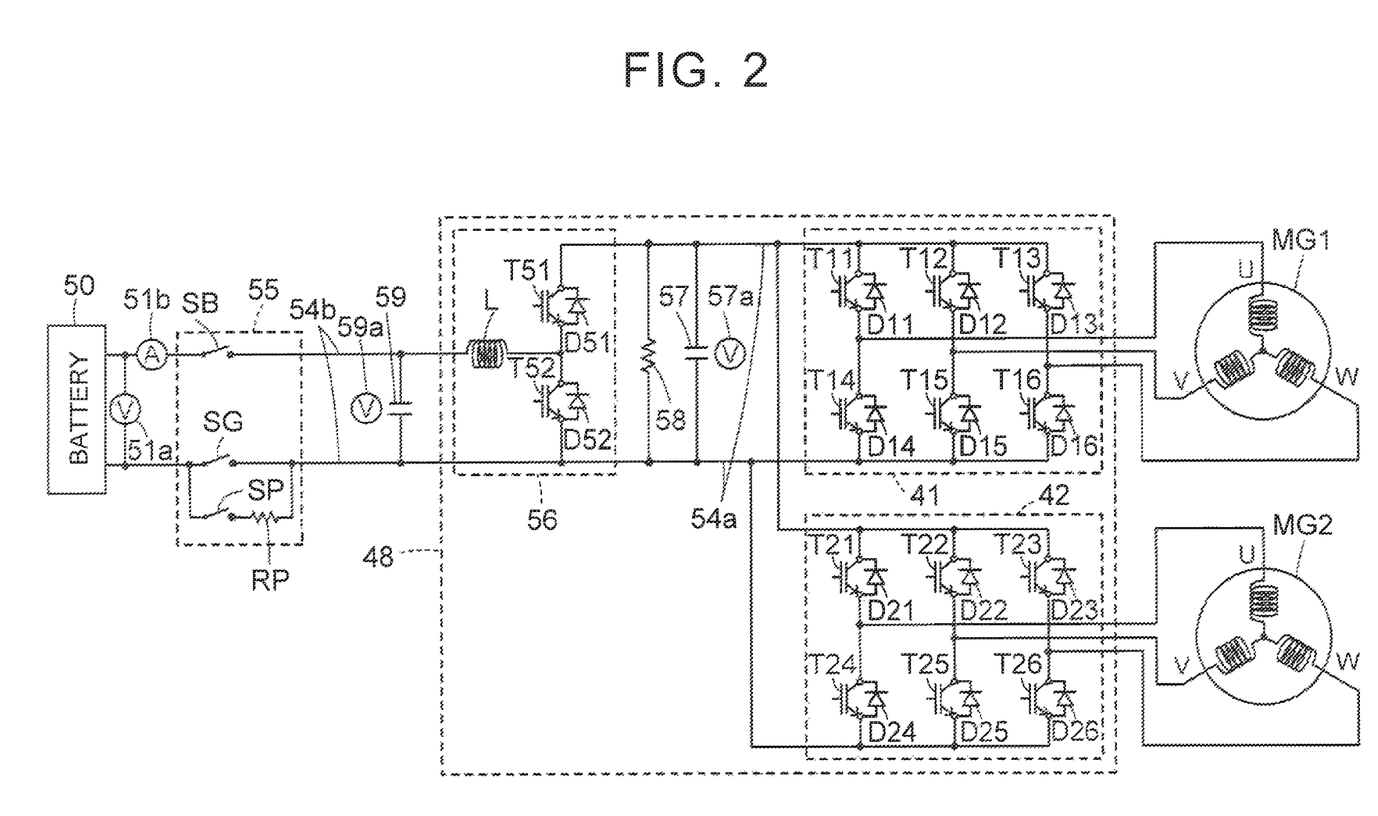
FIG. 2 is a schematic view showing a configuration of an electrical system including motors MG1, MG2.

The motor MG1 is constituted by a conventional synchronous motor/generator having a rotor in which a permanent magnet is embedded and a stator around which a three-phase coil is wound. As described above, the rotor is connected to the sun gear of the planetary gear 30. The motor MG2 is constituted by a similar synchronous motor generator to the motor MG1, and a rotor of the motor MG2 is connected to the drive shaft 36. The motors MG1, MG2 are driven by the motor ECU 40 through control of the inverters 41, 42. The inverters 41, 42 are connected to the step-up converter 56 by a power line (referred to hereafter as a drive voltage system power line) 54a, the step-up converter 56 being connected to a power line (referred to hereafter as a battery voltage system power line) 54b to which the battery 50 and a system main relay 55 are connected. As shown in FIG. 2, the inverters 41, 42 are respectively constituted by six transistors T11 to T16, T21 to T26, and six diodes D11 to D16, D21 to D26 that are connected in parallel to the transistors T11 to T16, T21 to T26 in opposite directions. The transistors T11 to T16, T21 to T26 are disposed in pairs so as to form a source side and a sink side relative to a positive electrode bus and a negative electrode bus of the drive voltage system power line 54a, and coils of three phases (a U phase, a V phase, and a W phase) of the motors MG1, MG2 are connected respectively to connection points between the respective pairs of transistors. Hence, by adjusting a proportion of an ON time of the transistors T11 to T16, T21 to T26 disposed in pairs while applying a voltage to the inverters 41, 42, a rotating magnetic field can be formed in the coils of the three phases, and as a result, the motors MG1, MG2 can be driven to rotate. The inverters 41, 42 share the positive electrode bus and the negative electrode bus of the drive voltage system power line 54a, and can therefore supply power generated by either of the motors MG1, MG2 to the other motor.

As shown in FIG. 2, the step-up converter 56 is formed from a step-up converter constituted by two transistors T51, T52, two diodes D51, D52 connected in parallel to the transistors T51, T52 in opposite directions, and a reactor L. The two transistors T51, T52 are connected to the positive electrode bus of the drive voltage system power line 54a and to negative electrode buses of the drive voltage system power line 54a and the battery voltage system power line 54b, respectively, while the reactor L is connected to a connection point between the transistors T51, T52 and a positive electrode bus of the battery voltage system power line 54b. Hence, by switching the transistors T51, T52 ON and OFF, power on the battery voltage system power line 54b can be stepped up and supplied to the drive voltage system power line 54a, while power on the drive voltage system power line 54a can be stepped down and supplied to the battery voltage system power line 54b.

A smoothing capacitor 57 used for smoothing and a discharge resistor 58 used for discharge are connected in parallel to the drive voltage system power line 54a, Further, the system main relay 55, which is constituted by a positive electrode side relay SB, a negative electrode side relay SG, a precharging relay SP, and a precharging resistor RP, is attached to a side of the battery voltage system power line 54b near an output terminal side of the battery 50, while a smoothing filter capacitor 59 is connected to a side of the battery voltage system power line 54b near the step-up converter 56.

The motor ECU 40 is constituted by a microprocessor, not shown in the drawings, that centers on a CPU and includes, in addition to the CPU, a ROM that stores a processing program, a RAM that stores data temporarily, an input/output port, and a communication port. Signals required to drive-control the motors MG1, MG2 are input into the motor ECU 40 via the input port. Rotation positions θm1, θm2 from rotation position detection sensors 43, 44 that detect rotation positions of the respective rotors of the motors MG1, MG2, motor temperatures Tmg from temperature sensors 45, 46 attached respectively to the motors MG1, MG2, phase currents applied to the motors MG1, MG2 and detected by a current sensor, not shown in the drawings, a voltage of the smoothing capacitor 57 (a voltage of the drive voltage system power line 54a; referred to hereafter as a drive voltage system voltage) VH, detected by a voltage sensor 57a attached between terminals of the capacitor 57, a voltage of the filter capacitor 59 (a voltage of the battery voltage system power line 54b; referred to hereafter as a battery voltage system voltage) VL, detected by a voltage sensor 59a attached between terminals of the filter capacitor 59, and so on may be cited as examples of the signals input via the input port. A switching control signal applied to the transistors T11 to T16, T21 to T26 of the inverters 41, 42, a switching control signal applied to the transistors T51, T52 of the step-up converter 56, and so on are output from the motor ECU 40 via the output port. Further, the motor ECU 40 communicates with the HV ECU 70 so as to drive-control the motors MG1, MG2 in response to a control signal from the HV ECU 70 and output data relating to operating conditions of the motors MG1, MG2 to the HV ECU 70 as required. Note that the motor ECU 40 also calculates respective rotation speeds Nm1, Nm2 of the motors MG1, MG2 on the basis of the rotation positions θm1, θm2 of the rotors of the motors MG1, MG2, obtained from the rotation position detection sensors 43, 44.

In this embodiment, the inverters 41, 42, the step-up converter 56, and the motor ECU 24 are housed as principal components in a single casing, and together constitute a power control unit (referred to hereafter as a PCU) 48.

The battery 50 is constituted by a lithium ion secondary battery, for example, that exchanges power with the motors MG1, MG2 via the inverters 41, 42. The battery ECU 52 that manages the battery 50 is constituted by a microprocessor, not shown in the drawings, that centers on a CPU and includes, in addition to the CPU, a ROM that stores a processing program, a RAM that stores data temporarily, an input/output port, and a communication port. Signals required to manage the battery 50 are input into the battery ECU 52 via the input port, and when necessary the battery ECU 52 transmits data relating to conditions of the battery 50 to the HV ECU 70 by communicating therewith. A battery voltage Vb from a voltage sensor 51a disposed between terminals of the battery 50, a battery current Ib from a current sensor 51b attached to a power line that is connected to an output terminal of the battery 50, a battery temperature Tb from a temperature sensor, not shown in the drawings, attached to the battery 50, and so on may be cited as examples of the signals input via the input port. Further, the battery ECU 52 manages the battery 50 by calculating a state of charge SOC, which is a ratio of an amount of power that can be discharged from the battery 50 relative to an overall capacity thereof, on the basis of an integrated value of the charging/discharging current Ib detected by the current sensor at that time, and by calculating input/output limits Win, Wout, which are maximum allowable amounts of power that can be charged to/discharged from the battery 50, on the basis of the calculated state of charge SOC and the battery temperature Tb.

The HV unit cooling apparatus 60 includes a radiator 62 in which the cooling water (long-life coolant (LLC)) and outside air exchange heat, a circulating flow passage 64 that circulates the cooling water through the radiator 62, the PCU 48, and the motors MG1, MG2 in that order, and an electric pump 66 that pumps the cooling water. The radiator 62 is disposed in a frontmost portion of an engine room, not shown in the drawings. A cooling water flow passage is disposed in the PCU 48 to supply cooling water to the inverters 41, 42 and the step-up converter 56 in order to cool the inverters 41, 42 and the step-up converter 56.

The HV ECU 70 is constituted by a microprocessor, not shown in the drawings, that centers on a CPU and includes, in addition to the CPU, a ROM that stores a processing program, a RAM that stores data temporarily, an input/output port, and a communication port. A pump rotation speed Np from a rotation speed sensor 66a that detects a rotation speed of the electric pump 66 of the HV unit cooling apparatus 60, an HV unit water temperature Thv from a temperature sensor 69 that detects a temperature of the cooling water in the HV unit cooling apparatus 60, an ignition signal from an ignition switch 80, a shift position SP from a shift position sensor 82 that detects an operation position of a shift lever 81, an accelerator depression amount Acc from an accelerator position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and so on are input into the HV ECU 70 via the input port. Further, a drive signal for the system main relay 55, a drive signal and a control signal for the electric pump 66 of the HV unit cooling apparatus 60, and so on are output from the HV ECU 70 via the output port. As described above, the HV ECU 70 is connected to the engine ECU 24, the motor ECU 40, and the battery ECU 52 via the communication port so as to exchange various control signals and data with the engine ECU 24, the motor ECU 40, and the battery ECU 52.

In the hybrid vehicle 20 according to this embodiment, configured as described above, a required torque to be output to the drive shaft 36 is calculated on the basis of the accelerator depression amount Acc, which corresponds to an amount by which a driver depresses the accelerator pedal 83, and the vehicle speed V, whereupon operations of the engine 22, the motor MG1, and the motor MG2 are controlled such that a required power corresponding to the required torque is output to the drive shaft 36. The operations of the engine 22, the motor MG1, and the motor MG2 are controlled in following operation modes (1) to (3). (1) In a torque conversion operation mode, the operation of the engine 22 is controlled such that power corresponding to the required power is output from the engine 22, while the motor MG1 and the motor MG2 are drive-controlled such that all of the power output from the engine 22 is torque-converted by the planetary gear 30, the motor MG1, and the motor MG2 and output to the drive shaft 36. (2) In a charge/discharge operation mode, the operation of the engine 22 is controlled such that power corresponding to a sum of the required power and an amount of power required to charge/discharge of the battery 50 is output from the engine 22, while the motor MG1 and the motor MG2 are drive-controlled such that all or a part of the power output from the engine 22 is torque-converted by the planetary gear 30, the motor MG1, and the motor MG2 while charging/discharging the battery 50, whereupon the required power is output to the drive shaft 36. (3) In a motor operation mode, the operation of the engine 22 is stopped and power corresponding to the required power is output to the drive shaft 36 from the motor MG2.

Figure 3:
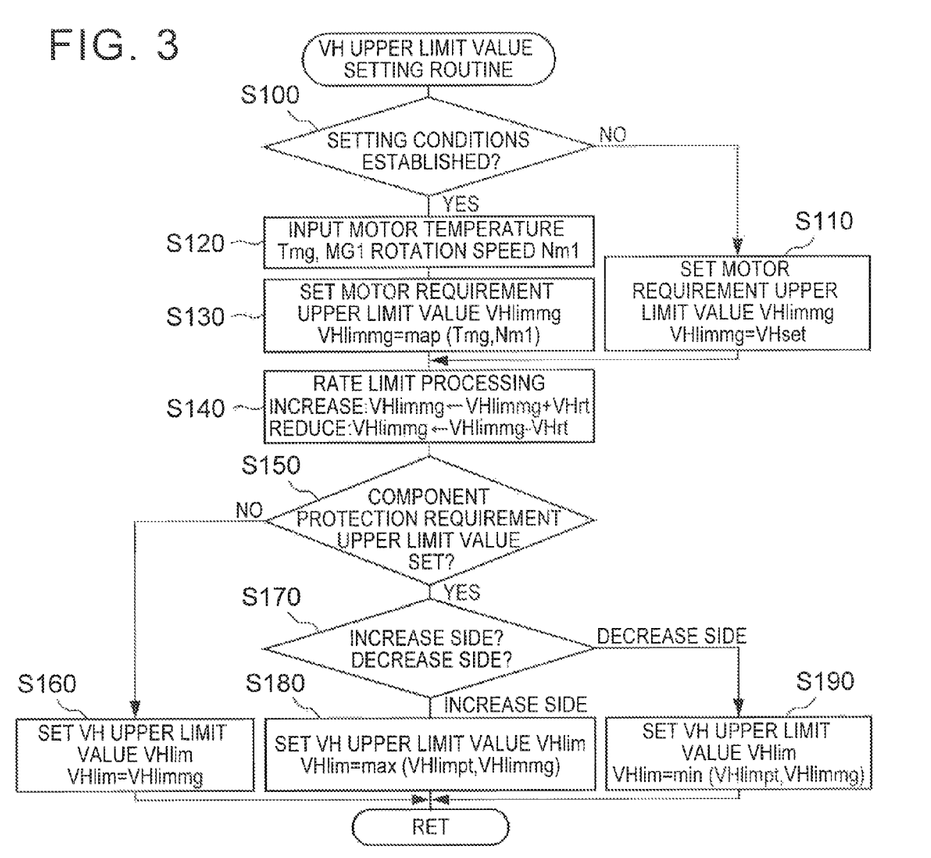
FIG. 3 is a flowchart showing an example of a VH upper limit value setting routine executed by a motor electronic control unit (ECU)

Next, an operation of the hybrid vehicle 20 according to this embodiment, configured as described above, and in particular an operation performed to set an upper limit value VHlim serving as a maximum voltage to which the drive voltage system voltage VH can be stepped up by the step-up converter 56 during braking, will be described. FIG. 3 is a flowchart showing an example of a VH upper limit value setting routine executed by the motor ECU 40. This routine is executed repeatedly at predetermined time intervals (every 100 msec or the like, for example).

When the VH upper limit value setting routine is executed, first, the motor ECU 40 determines whether or not conditions for increasing a regeneration amount are established (step S100). Three conditions are set, namely that a regeneration request has been issued, no abnormalities exist in the HV unit cooling apparatus 60, and an absolute value of the input limit Win of the battery 50 is large. The reason why issuance of a regeneration request is set as a condition is that increasing the regeneration amount is set as an aim during regeneration, and when a regeneration request is not issued, regeneration is not performed, meaning that there is no need to increase the regeneration amount. The reason why the absence of abnormalities in the HV unit cooling apparatus 60 is set as a condition is that when an abnormality occurs in the HV unit cooling apparatus 60, temperature management is not implemented appropriately on the PCU 48 (the inverters 41, 42 and the step-up converter 56), and as a result it may be impossible to suppress heat generation accompanying an increase in the regeneration amount appropriately. The reason why a large absolute value of the input limit Win of the battery 50 is set as a condition is that when the absolute value of the input limit Win of the battery 50 is small, the battery 50 cannot be charged by regenerative power. Determinations can be performed in relation to the respective conditions as follows. A regeneration request is set by the HV ECU 70 in order to improve the fuel efficiency, and therefore a determination as to whether or not a regeneration request has been issued can be made by receiving the regeneration request through communication with the HV ECU 70. A determination as to whether or not an abnormality has occurred in the HV unit cooling apparatus 60 can be made by reading an abnormality determination flag, which is set at a value of 1 when an abnormality occurs in the HV unit cooling apparatus 60, from the HV ECU 70, for example. A determination as to whether or not the absolute value of the input limit Win of the battery 50 is large can be made by receiving the input limit Win set by the battery ECU 52 through communication and comparing the absolute value thereof with a predetermined threshold.

Figure 4:
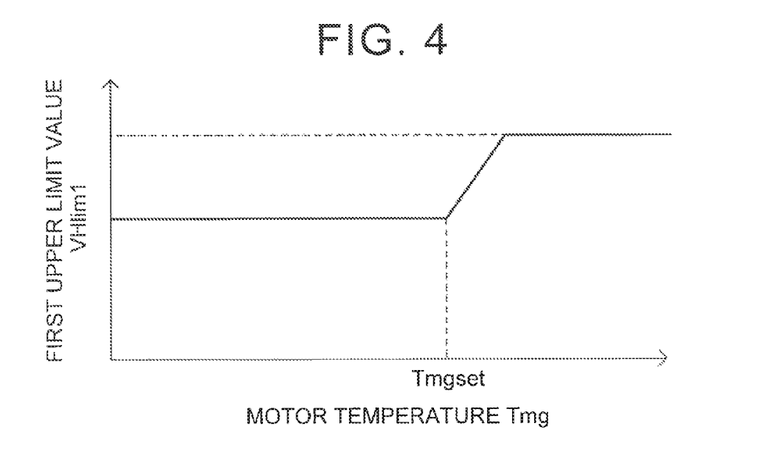
FIG. 4 is an illustrative view showing an example of a first upper limit value setting map.
Figure 5:
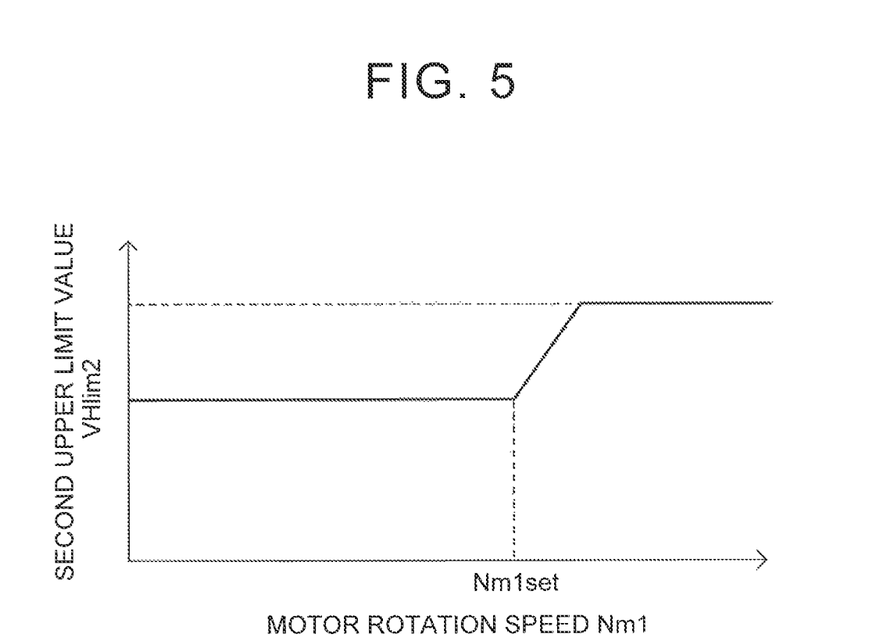
FIG. 5 is an illustrative view showing an example of a second upper limit value setting map.

When any one of the conditions for increasing the regeneration amount is not established, it is determined that the regeneration amount is not to be increased, and a preset, predetermined value VHset is set as a motor requirement upper limit value VHlimmg (step S110). When all of the conditions for increasing the regeneration amount are established, on the other hand, the motor temperature Tmg from the temperature sensors 45, 46 and the rotation speed Nm1 of the motor MG1 are input (step S120), whereupon the motor requirement upper limit value VHlimmg is set on the basis of the motor temperature Tmg and the rotation speed Nm1 of the motor MG1 (step S130). In this embodiment, the higher of the temperature of the motor MG2, obtained from the temperature sensor 45, and the temperature of the motor MG2, obtained from the temperature sensor 46, is used as the motor temperature Tmg. In this embodiment, the smaller of a first upper limit value VHlim1 derived from the motor temperature Tmg and a second upper limit value VHlim2 derived from the rotation speed Nm1 of the motor MG1 is set as the motor requirement upper limit value VHlimmg. The first upper limit value VHlim1 is obtained by determining a relationship between the motor temperature Tmg and the first upper limit value VHlim1 in advance by experiment and the like and storing this relationship as a first upper limit value setting map, and then extracting the corresponding first upper limit value VHlim1 from the map when the motor temperature Tmg is given. Further, the second upper limit value VHlim2 is obtained by determining a relationship between the rotation speed Nm1 of the motor MG1 and the second upper limit value VHlim2 in advance by experiment and the like and storing this relationship as a second upper limit value setting map, and then extracting the corresponding second upper limit value VHlim2 from the map when the rotation speed Nm1 of the motor MG1 is given. FIGS. 4 and 5 show examples of the first upper limit value setting map and the second upper limit value setting map, respectively.

On the first upper limit value setting map, as shown in FIG. 4, when the motor temperature Tmg is within a comparatively low temperature range below a predetermined temperature Tmgset, the first upper limit value VHlim1 is set to be small so that the drive voltage system voltage VH is limited to a low voltage in order to increase the regeneration amount during regeneration by suppressing heat generation by the diode D52 of the lower arm of the step-up converter 56. When the motor temperature Tmg is within a comparatively high temperature range at or above the predetermined temperature Tmgset, on the other hand, the limit imposed to reduce the drive voltage system voltage VH is relaxed and then canceled. When the motor temperature Tmg is high, a current flowing through the motors MG1, MG2 must be reduced in order to suppress an increase in the motor temperature Tmg, and for this purpose the drive voltage system voltage VH must be increased. Therefore, when the motor temperature Tmg equals or exceeds the predetermined temperature Tmgset, the limit imposed to reduce the drive voltage system voltage VH is relaxed or canceled.

On the second upper limit value setting map, as shown in FIG. 5, when the rotation speed Nm1 of the motor MG1 is within a comparatively low rotation range below a predetermined rotation speed Nm1set, the second upper limit value VHlim2 is set to be small so that the drive voltage system voltage VH is limited to a low voltage in order to increase the regeneration amount during regeneration by suppressing heat generation by the diode D52 of the lower arm of the step-up converter 56. When the rotation speed Nm1 of the motor MG1 is within a comparatively high rotation range at or above the predetermined rotation speed Nm1 set, on the other hand, the limit imposed to reduce the drive voltage system voltage VH is relaxed and then canceled. When the rotation speed Nm1 of the motor MG1 is high, torque for suppressing the rotation speed Ne of the engine 22 must be output from the motor MG1 to prevent the engine 22 from racing and the motor MG1 from overspeeding as a result. To suppress overspeeding of the motor MG1, the drive voltage system voltage VH must be increased so that sufficient torque can be output from the motor MG1. Hence, when the rotation speed Nm1 of the motor MG1 equals or exceeds the predetermined rotation speed Nm1set, the limit imposed to reduce the drive voltage system voltage VH is relaxed or canceled.

When the motor requirement upper limit value VHlimmg is set in this manner, rate limit processing for gently varying the previously set motor requirement upper limit value VHlimmg (referred to hereafter as the former upper limit value VHlimmg) is executed (step S140). More specifically, when the new motor requirement upper limit value VHlimmg is larger than the former upper limit value VHlimmg, the former upper limit value VHlimmg is increased (to an increase side) by adding a small rate value VHrt thereto. Further, when the new motor requirement upper limit value VHlimmg is smaller than the former upper limit value VHlimmg, the former upper limit value VHlimmg is reduced (to a decrease side) by subtracting the small rate value VHrt therefrom.

Next, a determination is made as to whether or not an upper limit value VHlimpt corresponding to component protection requirements has been set (step S150). An upper limit value for increasing the drive voltage system voltage VH in order to suppress heat generation by the diode D51 of the upper arm of the step-up converter 56, an upper limit value for reducing the drive voltage system voltage VH in order to suppress heat generation by the inverter 42 by locking the motor MG2, an upper limit value for reducing the drive voltage system voltage VH when the temperature Tw of the cooling water in the HV unit cooling apparatus 60 is high, and so on, for example, may be cited as the upper limit value VHlimpt corresponding to component protection requirements.

When the upper limit value VHlimpt corresponding to component protection requirements has not been set, the motor requirement upper limit value VHlimmg is set as the VH upper limit value VHlim (step S160), whereupon the routine is terminated. When the upper limit value VHlimpt corresponding to component protection requirements has been set, a determination is made as to whether the set upper limit value VHlimpt corresponding to component protection requirements is an upper limit value by which the drive voltage system voltage VH is increased or an upper limit value by which the drive voltage system voltage VH is reduced (step S170). When the upper limit value VHlimpt corresponding to component protection requirements is an upper limit value by which the drive voltage system voltage VH is increased, the larger of the upper limit value VHlimpt corresponding to component protection requirements and the motor requirement upper limit value VHlimmg is set as the VH upper limit value VHlim (step S180), whereupon the routine is terminated. When the upper limit value VHlimpt corresponding to component protection requirements is an upper limit value by which the drive voltage system voltage VH is reduced, the smaller of the upper limit value VHlimpt corresponding to component protection requirements and the motor requirement upper limit value VHlimmg is set as the VH upper limit value VHlim (step S190), whereupon the routine is terminated.

Figure 6:
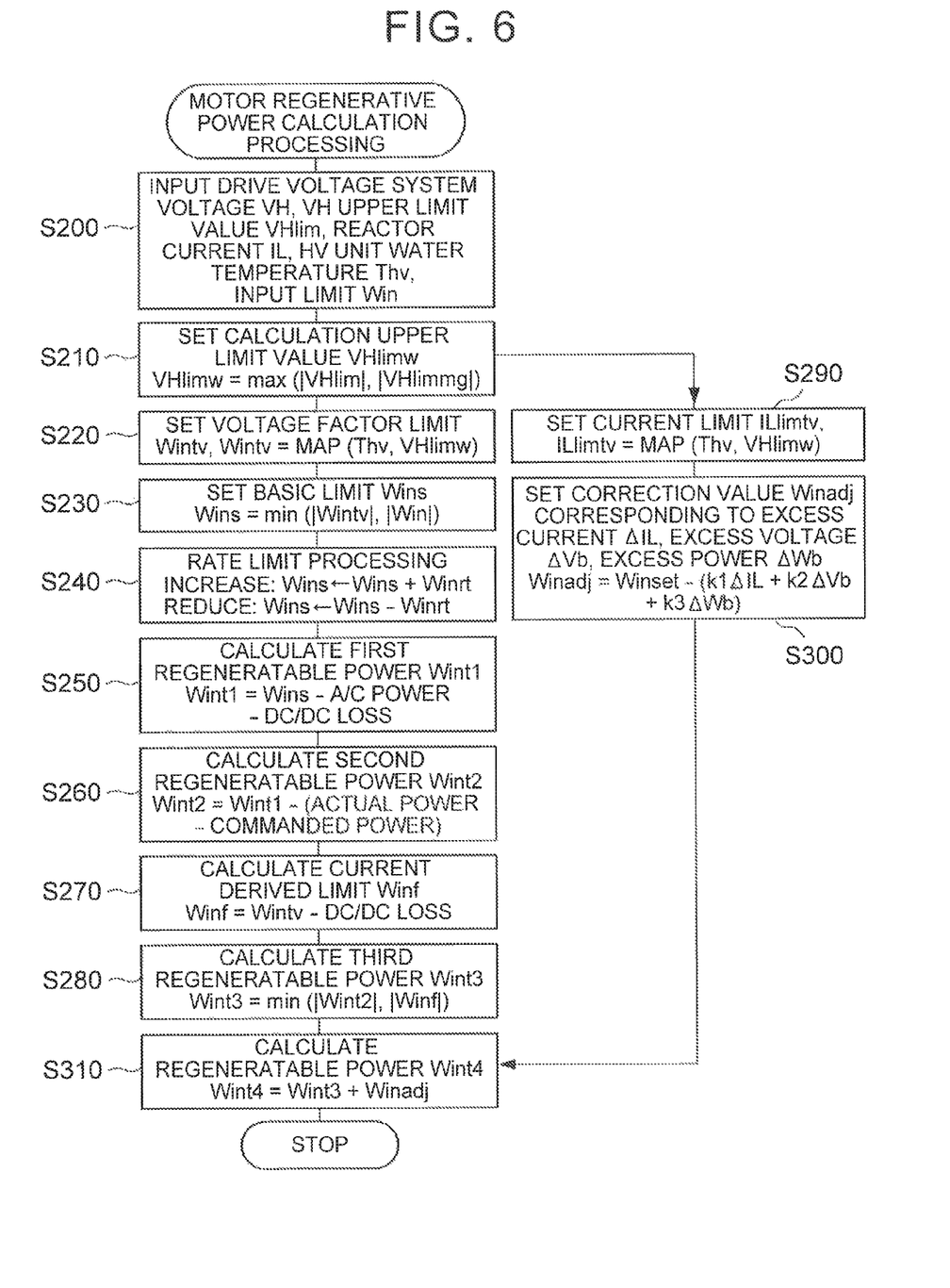
FIG. 6 is a flowchart showing an example of motor regenerative power calculation processing executed by the motor ECU.

The VH upper limit value VHlim set in this manner is used to calculate a motor regenerative power using the input limit Win of the battery 50. FIG. 6 is a flowchart showing an example of motor regenerative power calculation processing executed by the motor ECU 40. This processing is executed during regeneration. Note that the motor regenerative power calculation processing does not form a central part of the invention, and will therefore be described only briefly.

When the motor regenerative power calculation processing is executed, first, the motor ECU 40 receives data required for the calculation, such as the drive voltage system voltage VH, the VH upper limit value the reactor current IL, the HV unit water temperature Thv, and the input limit Win of the battery 50 (step S200). When a VH lower limit value has been pulled up in order to protect the diode D51 of the upper arm of the step-up converter 56, the larger of an absolute value of the VH upper limit value VHlim and an absolute value of the motor requirement upper limit value VHlimmg is selected as a calculation upper limit value VHlimw to ensure that the input limit Win of the battery 50 does not expand (step S210). A third regeneratable power Wint3 is then calculated by performing processing of steps S220 to S280, whereupon a correction value Winadj is calculated by performing processing of steps S290 and S300. A sum of these values is then calculated as a regeneratable power Wint4 (step S310), whereupon the motor regenerative power calculation processing is terminated. Regenerative control is then performed on the motor MG1 and the motor MG2 in accordance with the calculated regeneratable power Wint4.

Figure 7:
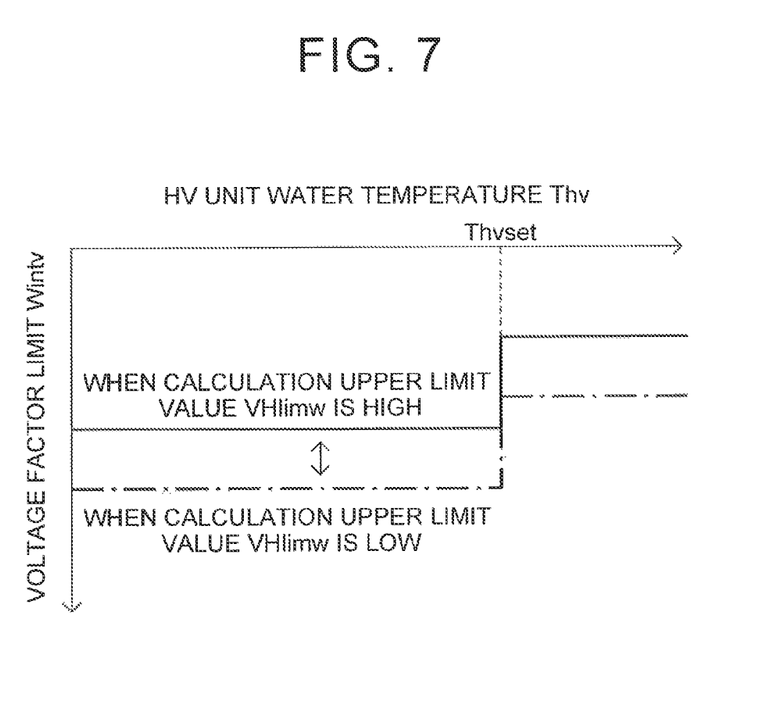
FIG. 7 is an illustrative view showing an example of a voltage factor limit setting map.

In the processing for calculating the third regeneratable power Wint3 (steps S220 to S280), first, a voltage factor limit Wintv is set on the basis of the HV unit water temperature Thv and the calculation upper limit value VHlimw (step S220). The voltage factor limit Wintv is set by determining a relationship between the HV unit water temperature Thv, the calculation upper limit value VHlimw, and the voltage factor limit Wintv in advance and storing the relationship as a voltage factor limit setting map, and then extracting the corresponding voltage factor limit Wintv from the map when the HV unit water temperature Thv and the calculation upper limit value VHlimw are given. FIG. 7 shows an example of the voltage factor limit setting map. In the drawing, solid lines show an example of a map obtained when the calculation upper limit value VHlimw is high, and dot-dash lines show an example of a map obtained when the calculation upper limit value VHlimw is low. As shown in the drawing, the voltage factor limit Wintv is limited by a larger amount when the HV unit water temperature Thv equals or exceeds a predetermined temperature Thvset than when the HV unit water temperature Thv is lower than the predetermined temperature Thvset, and is limited by a steadily larger amount as the calculation upper limit value VHlimw increases. Next, the smaller of an absolute value of the set voltage factor limit Wintv and the absolute value of the input limit Win of the battery 50 is set as a basic limit Wins (step S230), whereupon the basic limit Wins is determined by varying the previous basic limit Wins through rate limit processing using a rate value Winrt (step S240). Next, a basic first regeneratable power Wint1 is calculated by subtracting a power required by an air-conditioning apparatus, not shown in the drawings, that air-conditions a passenger compartment and a loss of a DC/DC converter, not shown in the drawings, for supplying power to accessories and the like from the basic limit Wins (step S250). A second regeneratable power Wint2 is then calculated by subtracting a difference between an actual regenerative power (an actual power) and a regenerative power (a commanded power) corresponding to a command value from the first regeneratable power Wint1 in order to eliminate a deviation between the command value and an actual value (step S260). Meanwhile, a current derived limit Winf is calculated by subtracting the loss of the DC/DC converter, not shown in the drawings, from the voltage factor limit Wintv (step S270), whereupon the smaller of an absolute value of the second regeneratable power Wint2 and an absolute value of the current derived limit Winf is set as the third regeneratable power Wint3, which serves as a lower limit guard corresponding to a feedforward term (step S280). Hence, the calculation upper limit value VHlimw obtained from the VH upper limit value set in the VH upper limit value setting routine of FIG. 3 is used to calculate the third regeneratable power Wint3. Accordingly, when a limit for reducing the drive voltage system voltage VH is imposed in order to increase the regeneration amount, the calculation upper limit value VHlimw decreases, leading to an increase in the absolute value of the voltage factor limit Wintv. The third regeneratable power Wint3 is set using the absolute value of the voltage factor limit Wintv, and therefore, when a limit for reducing the drive voltage system voltage VH is imposed in order to increase the regeneration amount, the third regeneratable power Wint3 also expands (the absolute value thereof increases).

Figure 8:
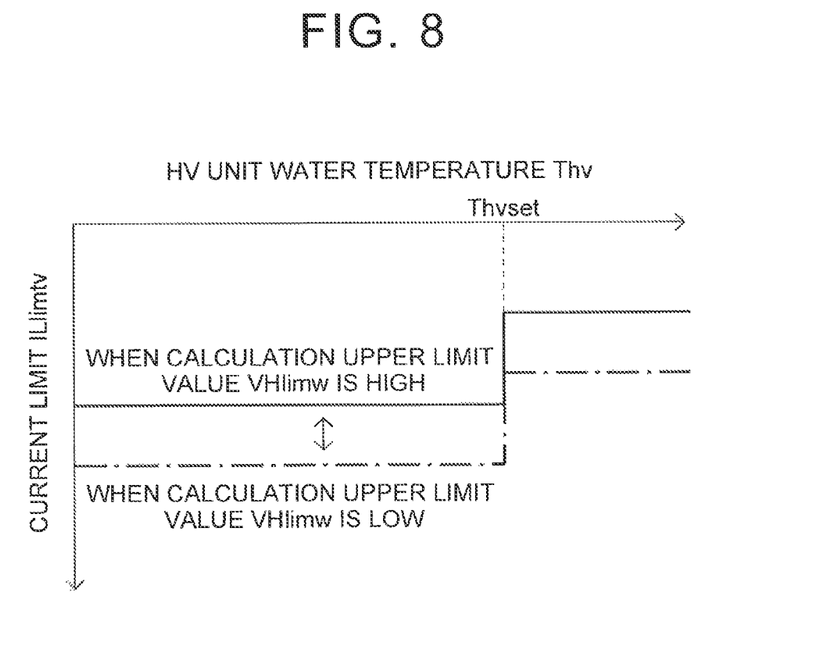
FIG. 8 is an illustrative view showing an example of a current limit setting map.

In the processing for setting the correction value Winadj (steps S290 and S300), first, a current limit ILlimtv serving as a limit value of the reactor current IL is set on the basis of the HV unit water temperature Thv and the calculation upper limit value VHlimw (step S290). The current limit ILlimtv is set by determining a relationship between the HV unit water temperature Thv, the calculation upper limit value VHlimw, and the current limit ILlimtv in advance and storing the relationship as a current limit setting map, and then extracting the corresponding current limit ILlimtv from the map when the HV unit water temperature Thv and the calculation upper limit value VHlimw are given. FIG. 8 shows an example of the current limit setting map. In the drawing, solid lines show an example of a map obtained when the calculation upper limit value VHlimw is high, and dot-dash lines show an example of a map obtained when the calculation upper limit value is low. As shown in the drawing, the current limit ILlimtv is limited by a larger amount when the HV unit water temperature Thv equals or exceeds the predetermined temperature Thvset than when the HV unit water temperature Thv is lower than the predetermined temperature Thvset, and is limited by a steadily larger amount as the calculation upper limit value VHlimw increases. Next, the correction value Winadj is set on the basis of an excess current $\Delta IL$ generated when the reactor current IL exceeds the current limit ILlimtv, an excess voltage $\Delta Vb$ generated when a voltage (a battery voltage) Vb of the battery 50 exceeds an allowable voltage, and an excess power $\Delta Wb$ generated when a charged power Wb of the battery 50 exceeds the input limit Win (step S300). The correction value Winadj is calculated using Equation (1), shown below, in which a sum of a product of the excess current $\Delta IL$ and a gain k1 (k1×$\Delta IL$), a product of the excess voltage $\Delta Vb$ and a gain k2 (k2×$\Delta Vb$), and a product of the excess power $\Delta Wb$ and a gain k3 (k3×$\Delta Wb$) is subtracted from a predetermined basic correction value Winset. Hence, the calculation upper limit value VHlimw obtained from the VH upper limit value VHlim set in the VH upper limit value setting routine of FIG. 3 is used to calculate the correction value Winadj. Accordingly, when a limit for reducing the drive voltage system voltage VH is imposed in order to increase the regeneration amount, the calculation upper limit value VHlimw decreases, leading to an increase in the absolute value of the current limit ILlimtv. The correction value Winadj is set using the absolute value of the current limit ILlimtv, and therefore, when a limit for reducing the drive voltage system voltage VH is imposed in order to increase the regeneration amount, the correction value Winadj also expands (the absolute value thereof increases).

$$Winadj = Winset(k1 \times \Delta IL + k2 \times \Delta Vb + k3 \times \Delta Wb) \quad (1)$$

As described above, when a limit for reducing the drive voltage system voltage VH is imposed in order to increase the regeneration amount, both the third regeneratable power Wint3 and the correction value Winadj also expand (the absolute values thereof increase), leading to an increase likewise in the regeneratable power Wint4 obtained as a sum thereof. As a result, the regeneration amount can be increased.

In the hybrid vehicle 20 according to this embodiment, described above, when all of the conditions for increasing the regeneration amount are established, and when the motor temperature Tmg, is lower than the predetermined temperature Tmgset, and the rotation speed Nm1 of the motor MG1 is lower than the predetermined rotation speed Nm1set, the motor requirement upper limit value VHlimmg is set by imposing a limit for reducing the drive voltage system voltage VH, whereupon the VH upper limit value is set using the set motor requirement upper limit value VHlimmg. In so doing, the regeneration amount can be increased by suppressing heat generation by the diode D52 of the lower arm of the step-up converter 56, and as a result, the fuel efficiency can be improved. Further, when all of the conditions for increasing the regeneration amount are established but the motor temperature Tmg equals or exceeds the predetermined temperature Tmgset or the rotation speed Nm1 of the motor MG1 equals or exceeds the predetermined rotation speed Nm1set, the motor requirement upper limit value VHlimmg is set by relaxing or canceling the limit for reducing the drive voltage system voltage VH, whereupon the VH upper limit value is set using the set motor requirement upper limit value VHlimmg. In so doing, an increase in the temperatures of the motor MG1 and the motor MG2 and an increase in the temperatures of the inverters 41, 42 can be suppressed, and overspeeding of the motor MG1 can be suppressed. As a result, the regeneration amount can be increased during braking while protecting the motor MG1 and the motor MG2.

In the hybrid vehicle 20 according to this embodiment, the motor requirement upper limit value VHlimmg is set by imposing a limit for reducing the drive voltage system voltage VH or by relaxing or canceling the limit for reducing the drive voltage system voltage VH on the basis of the motor temperature Tmg and the rotation speed Nm1 of the motor MG1. Instead, however, the motor requirement upper limit value VHlimmg may be set by imposing a limit for reducing the drive voltage system voltage VH or by relaxing or canceling the limit for reducing the drive voltage system voltage VH on the basis of the motor temperature Tmg alone. In other words, in the processing of step S130, the motor requirement upper limit value VHlimmg may be set by applying the motor temperature Tmg to the first upper limit value setting map shown in FIG. 4. Further, the motor requirement upper limit value VHlimmg may be set by imposing a limit for reducing the drive voltage system voltage VH or by relaxing or canceling the limit for reducing the drive voltage system voltage VH on the basis of the rotation speed Nm1 of the motor MG1 alone. In other words, in the processing of step S130, the motor requirement upper limit value VHlimmg may be set by applying the rotation speed Nm1 of the motor MG1 to the second upper limit value setting map shown in FIG. 5.

In the hybrid vehicle 20 according to this embodiment, three conditions, namely that a regeneration request has been issued, no abnormalities exist in the HV unit cooling apparatus 60, and the absolute value of the input limit Win of the battery 50 is large, are set as the conditions for increasing the regeneration amount, but any one or any two of these conditions may be used alone. Further, another condition may be added to the three conditions. Moreover, another condition may be added to any one or two of the three conditions.

An embodiment of the invention was described above, but the invention is not limited in any way to this embodiment, and may of course be implemented in various embodiments within a scope that does not depart from the spirit of the invention.

The invention may be used in the hybrid vehicle construction industry or the like.

What is claimed is:

1. A hybrid vehicle comprising:
   an internal combustion engine;
   a power generator configured to receive and output power;
   a planetary gear including three rotary elements, the three rotary elements being connected respectively to an output shaft of the internal combustion engine, a rotary shaft of the power generator, and a drive shaft coupled to an axle;
   a motor configured to i) receive power from the drive shaft and ii) output power to the drive shaft;
   a drive circuit configured to drive the power generator and the motor;
   a battery;
   a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and
   at least one electronic control unit configured to
   i) control the buck-boost converter such that a voltage of the high voltage power line reaches a voltage that is a) equal to or smaller than an upper limit voltage and b) is based on a torque command applied to the power generator and the motor,
   ii) control the internal combustion engine, the power generator, and the motor such that a required torque corresponding to a request from a driver is output and used to run the hybrid vehicle,
   iii) limit the upper limit voltage to a braking limit when a rotation speed of the power generator is lower than a predetermined rotation speed during regenerative braking in the hybrid vehicle, and
   iv) relax the limit on the upper limit voltage in comparison with the braking limit when the rotation speed of the power generator equals or exceeds the predetermined rotation speed during regenerative braking in the hybrid vehicle.

2. The hybrid vehicle according to claim 1, wherein the electronic control unit is configured to set a predetermined upper limit voltage as the upper limit voltage when a chargeable power of the battery is smaller than a predetermined power.

3. The hybrid vehicle according to claim 1, further comprising a cooling apparatus configured to cool the drive circuit,
   wherein the electronic control unit is configured to set a predetermined upper limit voltage as the upper limit voltage when an abnormality occurs in the cooling apparatus.

4. The hybrid vehicle according to claim 1, wherein the electronic control unit is configured to relax the limit on the upper limit voltage by canceling the limit on the upper limit voltage.

5. A hybrid vehicle comprising:
   an internal combustion engine;
   a power generator configured to receive and output power;
   a planetary gear including three rotary elements, the three rotary elements being connected respectively to an output shaft of the internal combustion engine, a rotary shaft of the power generator, and a drive shaft coupled to an axle;
   a motor configured to i) receive power from the drive shaft and ii) output power to the drive shaft;
   a drive circuit configured to drive the power generator and the motor;
   a battery;
   a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and at least one electronic control unit configured to i) control the buck-boost converter such that a voltage of the high voltage power line reaches a voltage that is a) equal to or smaller than an upper limit voltage and is b) based on a torque command applied to the power generator and the motor, ii) control the internal combustion engine, the power generator, and the motor such that a required torque corresponding to a request from a driver is output and used to run the hybrid vehicle, iii) limit the upper limit voltage to a braking limit when a temperature of the power generator or the motor is lower than a predetermined temperature during regenerative braking in the hybrid vehicle, and iv) relax the limit on the upper limit voltage in comparison with the braking limit when the temperature of the power generator or the motor equals or exceeds the predetermined temperature during regenerative braking in the hybrid vehicle.

6. The hybrid vehicle according to claim 5, wherein the electronic control unit is configured to set a predetermined upper limit voltage as the upper limit voltage when a chargeable power of the battery is smaller than a predetermined power.

7. The hybrid vehicle according to claim 5, further comprising a cooling apparatus configured to cool the drive circuit,
wherein the electronic control unit is configured to set a predetermined upper limit voltage as the upper limit voltage when an abnormality occurs in the cooling apparatus.

8. The hybrid vehicle according to claim 5, wherein the electronic control unit is configured to relax the limit on the upper limit voltage by canceling the limit on the upper limit voltage.

9. A hybrid vehicle comprising:
an internal combustion engine;
a power generator configured to receive and output power;
a planetary gear including three rotary elements, the three rotary elements being connected respectively to an output shaft of the internal combustion engine, a rotary shaft of the power generator, and a drive shaft coupled to an axle;
a motor configured to i) receive power from the drive shaft and ii) output power to the drive shaft;
a drive circuit configured to drive the power generator and the motor;
a battery;
a buck-boost converter including a switching element, a diode, and a reactor, the buck-boost converter being connected to a low voltage power line on the battery side and a high voltage power line on the drive circuit side by switching the switching element, the buck-boost converter being configured to step up power on the low voltage power line and supply the stepped-up power to the high voltage power line, and the buck-boost converter being configured to step down power on the high voltage power line and supply the stepped-down power to the low voltage power line; and at least one electronic control unit configured to i) control the buck-boost converter such that a voltage of the high voltage power line reaches a voltage that is a) equal to or smaller than an upper limit voltage and is b) based on a torque command applied to the power generator and the motor, ii) control the internal combustion engine, the power generator, and the motor such that a required torque corresponding to a request from a driver is output and used to run the hybrid vehicle, iii) limit the upper limit voltage to a braking limit when a) a rotation speed of the power generator is lower than a predetermined rotation speed and b) a temperature of the power generator or the motor is lower than a predetermined temperature during regenerative braking in the hybrid vehicle, and iv) relax the limit on the upper limit voltage in comparison with the braking limit when c) the rotation speed of the power generator equals or exceeds the predetermined rotation speed or d) the temperature of the power generator or the motor equals or exceeds the predetermined temperature, during regenerative braking in the hybrid vehicle.

10. The hybrid vehicle according to claim 9, wherein the electronic control unit is configured to set a predetermined upper limit voltage as the upper limit voltage when a chargeable power of the battery is smaller than a predetermined power.

11. The hybrid vehicle according to claim 9, further comprising a cooling apparatus configured to cool the drive circuit,
wherein the electronic control unit is configured to set a predetermined upper limit voltage as the upper limit voltage when an abnormality occurs in the cooling apparatus.

12. The hybrid vehicle according to claim 9, wherein the electronic control unit is configured to relax the limit on the upper limit voltage by canceling the limit on the upper limit voltage.

* * * * *